US008325410B2

United States Patent
Lee

(10) Patent No.: US 8,325,410 B2
(45) Date of Patent: Dec. 4, 2012

(54) MODULATION SYSTEM AND METHOD FOR GENERATING A RETURN-TO-ZERO (RZ) OPTICAL DATA SIGNAL

(75) Inventor: Kun-Jing Lee, Fremont, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 371 days.

(21) Appl. No.: 12/859,105

(22) Filed: Aug. 18, 2010

(65) Prior Publication Data

US 2011/0043888 A1 Feb. 24, 2011

Related U.S. Application Data

(60) Provisional application No. 61/235,293, filed on Aug. 19, 2009.

(51) Int. Cl.
*G02F 1/01* (2006.01)
*G02F 1/29* (2006.01)
*G02B 26/08* (2006.01)

(52) U.S. Cl. ..................... 359/279; 359/298

(58) Field of Classification Search ............ 359/279, 359/237–239, 246, 276–278, 284, 286–289, 359/290–292, 298; 398/37, 22–24, 140–143, 398/195–198

See application file for complete search history.

(56) References Cited

U.S. PATENT DOCUMENTS

| | | | |
|---|---|---|---|
| 7,398,022 B2 | 7/2008 | Zitelli | 398/183 |
| 7,466,926 B2 | 12/2008 | Kao et al. | 398/188 |
| 7,701,630 B2 | 4/2010 | Kissa et al. | 359/254 |
| 7,734,190 B2 | 6/2010 | Bai | 398/185 |
| 2006/0245763 A1 | 11/2006 | Ishida et al. | 398/186 |
| 2009/0304395 A1* | 12/2009 | Hong et al. | 398/189 |
| 2010/0111464 A1 | 5/2010 | Kissa | 385/2 |
| 2011/0043888 A1* | 2/2011 | Lee | 359/279 |

* cited by examiner

*Primary Examiner* — Thomas K Pham
*Assistant Examiner* — Brandi Thomas
(74) *Attorney, Agent, or Firm* — Matthew A. Pequignot; Pequignot + Myers LLC

(57) ABSTRACT

A modulation system and a method for generating a return-to-zero (RZ) optical data signal are provided. The modulation system comprises a Mach-Zehnder (MZ) modulator and a drive circuit, which includes a logic XOR gate and a differential amplifier. The logic XOR gate applies a logic XOR operation to a non-return-to-zero (NRZ) electrical data signal and an inverse of an electrical clock signal to generate an electrical intermediate signal. The differential amplifier differentially amplifies the electrical intermediate signal and an inverse of the NRZ electrical data signal to generate an RZ electrical drive signal. The drive circuit drives the MZ modulator with the RZ electrical drive signal to generate the RZ optical data signal.

18 Claims, 7 Drawing Sheets

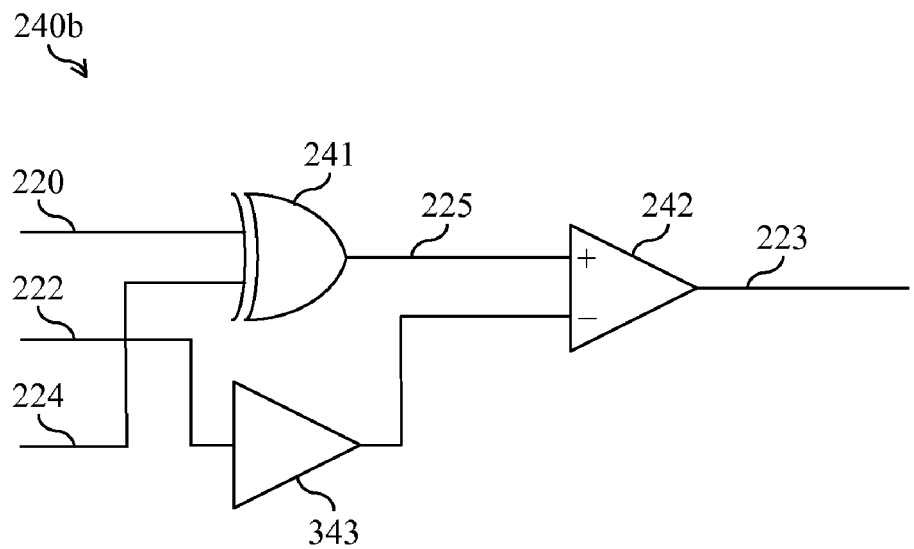
FIG. 3B
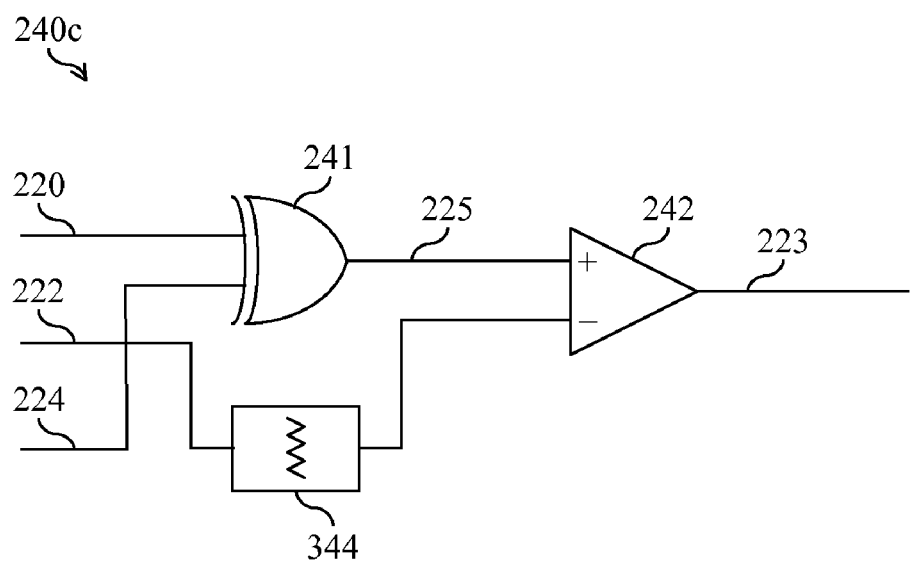
FIG. 3C

MODULATION SYSTEM AND METHOD FOR GENERATING A RETURN-TO-ZERO (RZ) OPTICAL DATA SIGNAL

CROSS-REFERENCE TO RELATED APPLICATIONS

The present invention claims priority from U.S. patent application Ser. No. 61/235,293 to Lee filed on Aug. 19, 2009, which is incorporated herein by reference.

TECHNICAL FIELD

The present invention relates to modulation systems and methods for generating a return-to-zero (RZ) optical data signal and, in particular, to modulation systems and methods for generating an RZ optical data signal by driving a Mach-Zehnder (MZ) modulator with an RZ electrical drive signal.

BACKGROUND OF THE INVENTION

Optical fiber dispersion limits both the data rate and the length of an optical fiber link. Therefore, return-to-zero (RZ) differential quadrature phase-shift keying (DQPSK) is attractive as a modulation format for optical signals, because it provides superior tolerance to chromatic dispersion and polarization-mode dispersion (PMD).

A conventional RZ-DQPSK modulation system 100 includes a first dual-parallel Mach-Zehnder (DPMZ) modulator 110 and a second Mach-Zehnder (MZ) modulator 111 optically connected in series. The first DPMZ modulator 110 includes two MZ modulators 112 optically connected in parallel. The MZ modulators 112 of the first DPMZ modulator 110 are driven with non-return-to-zero (NRZ) electrical data signals 120 to generate NRZ optical data signals 130 having a relative phase shift of $\pi/2$, which are components of an NRZ-DQPSK optical data signal 131, by phase-modulating optical carrier signals 132. The second MZ modulator 111 is driven with an electrical clock signal 121 to generate an RZ-DQPSK optical data signal 133 by RZ pulse carving the NRZ-DQPSK optical data signal 131. Unfortunately, the use of a second MZ modulator 111 for RZ pulse carving in this conventional RZ-DQPSK modulation system 100 leads to increased manufacturing cost and decreased operating efficiency.

As an alternative to using a second MZ modulator for RZ pulse carving, an MZ modulator may be driven with an RZ electrical drive signal to generate an RZ optical data signal. As disclosed in U.S. Pat. No. 7,466,926 to Kao et al., issued on Dec. 16, 2008, which is incorporated herein by reference, an RZ electrical drive signal may be generated by applying a logic AND operation to an NRZ electrical data signal and an electrical clock signal to generate a first electrical intermediate signal, by applying a logic AND operation to an inverse of the NRZ electrical data signal and an electrical clock signal to generate a second electrical intermediate signal, and by differentially amplifying the first electrical intermediate signal and the second electrical intermediate signal to generate an RZ electrical drive signal. This approach to generating an RZ electrical drive signal requires the use of two high-speed logic gates.

SUMMARY OF THE INVENTION

An object of the present invention is to provide a simpler approach to generating a return-to-zero (RZ) electrical drive signal, requiring the use of only one high-speed logic gate. The RZ electrical drive signal is used to drive a Mach-Zehnder (MZ) modulator to generate an RZ optical data signal.

Accordingly, the present invention relates to a modulation system for generating an RZ optical data signal, comprising: an MZ modulator for generating the RZ optical data signal in response to an RZ electrical drive signal; and a drive circuit, electrically connected to the MZ modulator, for generating the RZ electrical drive signal, and for driving the MZ modulator with the RZ electrical drive signal, comprising: a logic XOR gate for receiving a non-return-to-zero (NRZ) electrical data signal and an inverse of an electrical clock signal, and for applying a logic XOR operation to the NRZ electrical data signal and the inverse of the electrical clock signal to generate an electrical intermediate signal; and a differential amplifier, electrically connected to the logic XOR gate and to the MZ modulator, for receiving the electrical intermediate signal and an inverse of the NRZ electrical data signal, and for differentially amplifying the electrical intermediate signal and the inverse of the NRZ electrical data signal to generate the RZ electrical drive signal.

Another aspect of the present invention relates to a method of generating an RZ optical data signal, comprising: a) providing an MZ modulator; b) generating an RZ electrical drive signal by: i) receiving an NRZ electrical data signal, an inverse of the NRZ electrical data signal, and an inverse of an electrical clock signal; ii) applying a logic XOR operation to the NRZ electrical data signal and the inverse of the electrical clock signal to generate an electrical intermediate signal; and iii) differentially amplifying the electrical intermediate signal and the inverse of the electrical data signal to generate the RZ electrical drive signal; and c) generating the RZ optical data signal by driving the MZ modulator with the RZ electrical drive signal.

BRIEF DESCRIPTION OF THE DRAWINGS

The invention will be described in greater detail with reference to the accompanying drawings, wherein:

FIG. 3B is a circuit diagram of a second embodiment of a drive circuit according to the present invention;

FIG. 3C is a circuit diagram of a third embodiment of a drive circuit according to the present invention;

DETAILED DESCRIPTION

The present invention provides a modulation system for generating a return-to-zero (RZ) optical data signal by driving a Mach-Zehnder (MZ) modulator with an RZ electrical drive signal.

Figure 1:
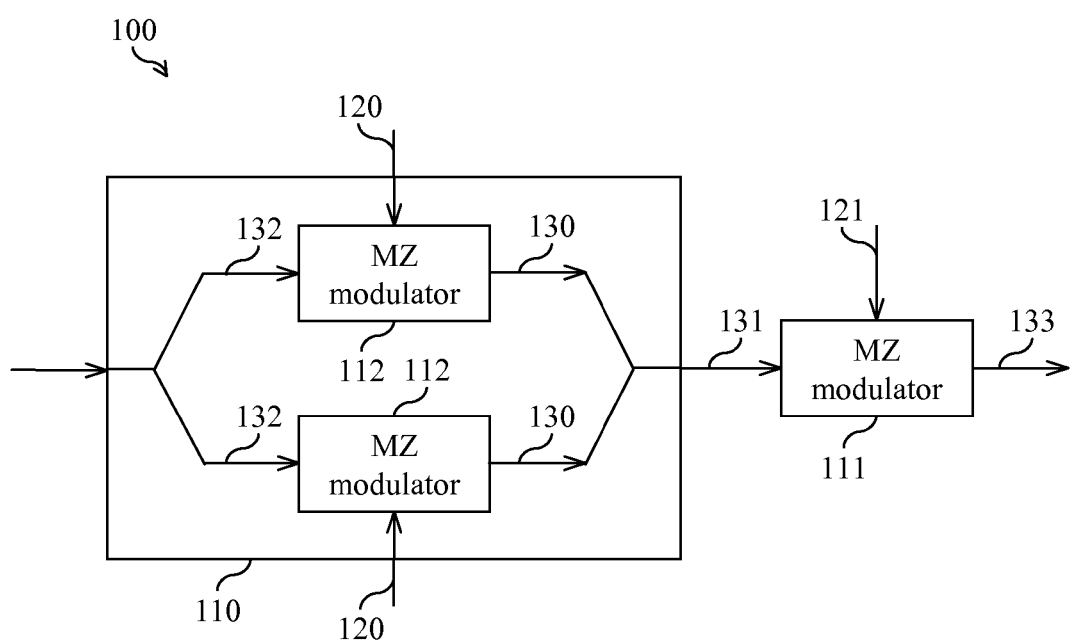
FIG. 1 is a block diagram of a conventional return-to-zero (RZ) differential quadrature phase-shift keying (DQPSK) modulation system.
Figure 2:
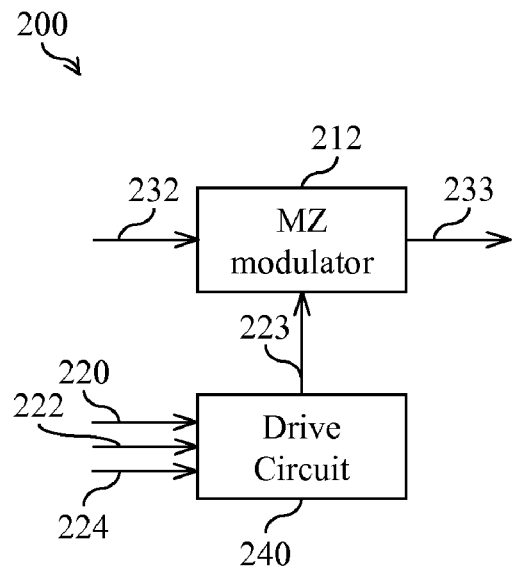
FIG. 2 is a block diagram of a first embodiment of a modulation system according to the present invention.

With reference to FIG. 2, a first embodiment of the modulation system 200 includes an MZ modulator 212 for generating an RZ optical data signal 233 in response to an RZ electrical drive signal 223, and a drive circuit 240, which is electrically connected to the MZ modulator 212, for generating the RZ electrical drive signal 223. Typically, the drive circuit 240 is alternating current (AC) coupled to an electrical signal source, such as a clock data recovery (CDR) circuit or a multiplexer, and to the MZ modulator 212.

The drive circuit 240 receives at least a non-return-to-zero (NRZ) electrical data signal 220, an inverse of the NRZ electrical data signal 222, and an inverse of an electrical clock signal 224, as differential outputs from the electrical signal source. The inverse of the electrical clock signal 224 is synchronized with the NRZ electrical data signal 220 and its inverse 222, such that the clock rate of the inverse of the electrical clock signal 224 is substantially equivalent to the data rate of the NRZ electrical data signal 220 and its inverse 222. Typically, the duty cycle of the inverse of the electrical clock signal 224 is 50%; however, the duty cycle may be adjusted as necessary to provide the RZ electrical drive signal 223 with a desired waveform.

Figure 3A:
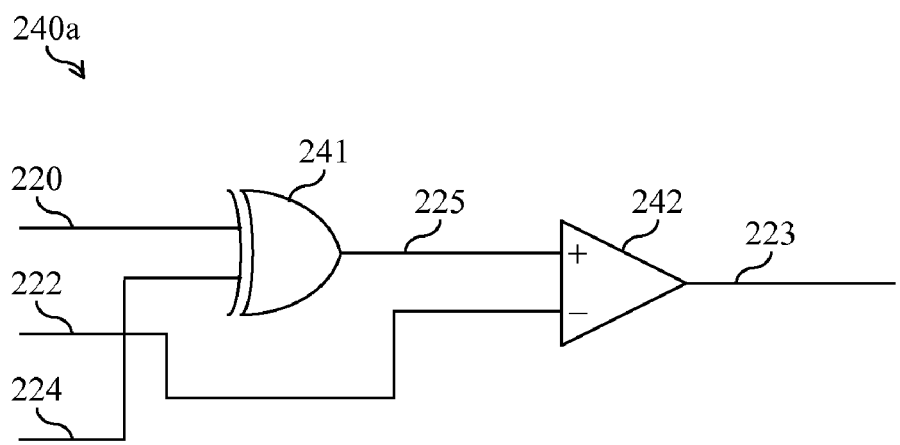
FIG. 3A is a circuit diagram of a first embodiment of a drive circuit according to the present invention.

With reference to FIGS. 3A to 3C, the drive circuit 240 includes a logic XOR gate 241 and a differential amplifier 242, which is electrically connected to the logic XOR gate 241 and to the MZ modulator 212. Typically, the logic XOR gate 241 and the differential amplifier 242, in some instances, via an amplitude adjuster, are electrically connected to the electrical signal source. The logic XOR gate 241 receives the NRZ electrical data signal 220 and the inverse of the electrical clock signal 224 from the electrical signal source, and applies a logic XOR operation to the NRZ electrical data signal 220 and the inverse of the electrical clock signal 224 to generate an electrical intermediate signal 225. The differential amplifier 242 receives the electrical intermediate signal 225 from the logic XOR gate 241 and the inverse of the NRZ electrical data signal 222 from the electrical signal source, in some instances, via an amplitude adjuster, and differentially amplifies the electrical intermediate signal 225 and the inverse of the NRZ electrical data signal 222 to generate the RZ electrical drive signal 223.

With particular reference to FIGS. 3B and 3C, some embodiments of the drive circuit 240b and 240c also include an amplitude adjuster, such as a buffer amplifier 343 or an attenuator pad 344, which is electrically connected to the electrical signal source and to the differential amplifier 242. The amplitude adjuster receives the inverse of the NRZ electrical data signal 222 from the electrical signal source, and adjusts the amplitude of the inverse of the NRZ electrical data signal 222, through amplification or attenuation, to be substantially equivalent to the amplitude of the electrical intermediate signal 225. Typically, the absolute difference between the amplitudes of the inverse of the NRZ electrical data signal 222 and the electrical intermediate signal 225 is less than or equal to the minimum differential input voltage of the differential amplifier 242. Consequently, the electrical intermediate signal 225 and the inverse of the NRZ electrical data signal 222 are substantially amplitude-balanced when they are received by the differential amplifier 242.

Those skilled in the art will appreciate that any of the logic XOR gate 241, the differential amplifier 242, and the optional amplitude adjuster included in the drive circuit 240 may be replaced by a different component performing the same function. Furthermore, additional components may be included in the drive circuit 240, as necessary.

Figure 4:
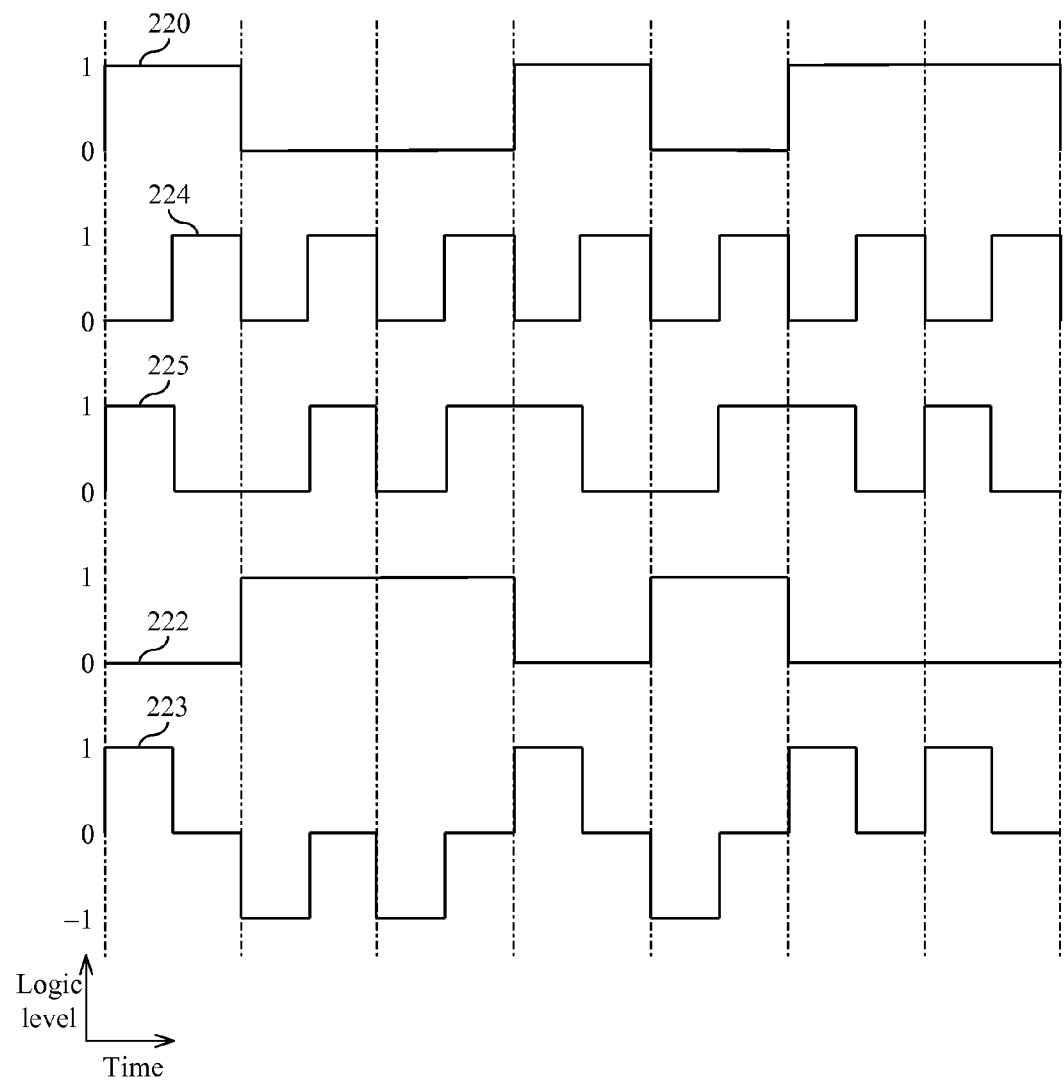
FIG. 4 is a plot of waveforms of a non-return-to-zero (NRZ) electrical data signal, an inverse of an electrical clock signal, an electrical intermediate signal, an inverse of the NRZ electrical data signal, and an RZ electrical drive signal.

With reference to FIG. 4, the NRZ electrical data signal 220, illustrated with a hypothetical data stream, the inverse of the electrical clock signal 224, the electrical intermediate signal 225, and the inverse of the NRZ electrical data signal 222 are all 2-level signals, having two different logic levels, a 1 level represented by a high voltage and a 0 level represented by a low voltage. The RZ electrical drive signal 223, on the other hand, is a 3-level signal, having three different logic levels, a 1 level represented by a high voltage, a 0 level represented by zero voltage, and a −1 level represented by a low voltage.

With reference again to FIG. 2, the RZ electrical drive signal 223 is used to drive the MZ modulator 212, which may be any type of MZ modulator, for example, an LiNbO$_3$ MZ modulator, an InP MZ modulator, or a GaAs MZ modulator. The MZ modulator 212 receives the RZ electrical drive signal 223, and phase-modulates an optical carrier signal 232, in response to the RZ electrical drive signal 223, to generate the RZ optical data signal 233.

Figure 5:
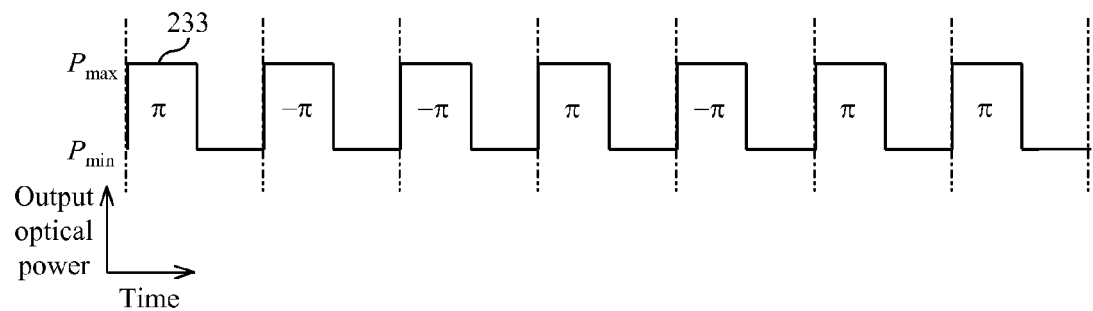
FIG. 5 is a plot of a waveform of an RZ optical data signal.

With reference to FIG. 5, the 1 level and the −1 level of the RZ electrical drive signal 223, which correspond to the 1 level and the 0 level of the NRZ electrical data signal 220, produce two different relative phase shifts in the RZ optical data signal 233. The 0 level of the RZ electrical drive signal 223 produces RZ pulses in the RZ optical data signal 233.

Figure 6:
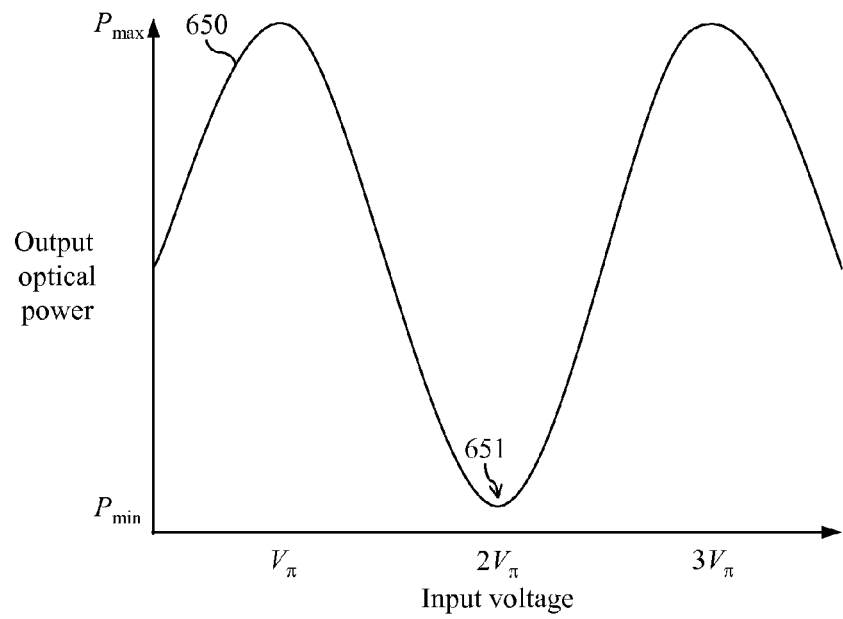
FIG. 6 is a plot of a transfer function of a Mach-Zehnder (MZ) modulator.

With reference to FIG. 6, the MZ modulator 212 is characterized by a transfer function 650 describing the relationship between the voltage input to the MZ modulator 212 and the optical power output by the MZ modulator 212. The MZ modulator 212 is further characterized by a switching voltage $V_\pi$, also referred to as a half-wave voltage, which corresponds to an input voltage producing a relative phase shift of $\pi$ and resulting in a maximum change in output optical power. Typically, the MZ modulator 212 is biased at a minimum 651, also referred to as a null, of the transfer function 650. Preferably, the MZ modulator 212 is biased at a bias voltage of approximately $2V_\pi$, and the RZ electrical drive signal 232 has an amplitude, measured peak to peak, of approximately $2V_\pi$. Typically, $2V_\pi$ is of approximately 6 V to 8 V.

Accordingly, with reference again to FIG. 5, an input voltage of $3V_\pi$, which produces a relative phase shift of $\pi$, corresponds to the 1 level of the RZ electrical drive signal 232, an input voltage of $2V_\pi$, which produces no relative phase shift, corresponds to the 0 level of the RZ electrical drive signal 223, and an input voltage of $V_\pi$, which produces a relative phase shift of $-\pi$, corresponds to the −1 level of the RZ electrical drive signal 223. Thus, in the RZ optical data signal 233, the 1 level and the 0 level of the NRZ electrical data signal 220 are represented as RZ pulses having two different relative phase shifts, $\pi$ and $-\pi$.

It should be noted that the modulation system provided by the present invention is not limited to a single MZ modulator 212 and a single drive circuit 240, but may include a plurality of MZ modulators 212 and/or a plurality of drive circuits 240.

Figure 7:
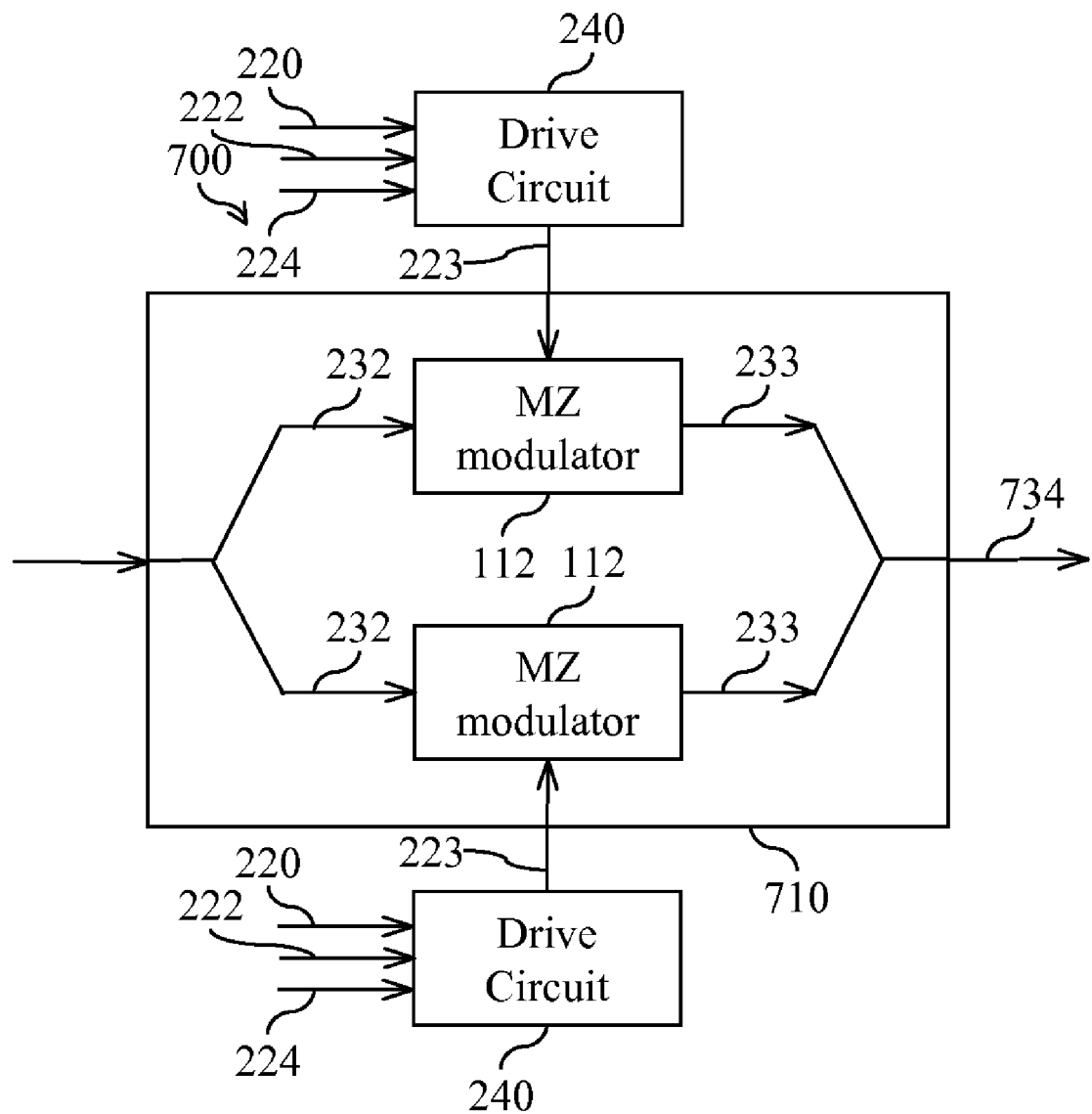
FIG. 7 is a block diagram of a second embodiment of a modulation system according to the present invention.

For example, with reference to FIG. 7, a second embodiment of the modulation system 700, preferred for RZ quadrature phase-shift keying (QPSK) and RZ differential quadrature phase-shift keying (DQPSK) applications, includes two MZ modulators 212, which are optically connected in parallel as components of a dual-parallel Mach-Zehnder (DPMZ) modulator 710. A prior-art DPMZ is described in U.S. Pat. No. 7,701,630 to Kissa et al., issued on Apr. 20, 2010, for example, which is incorporated herein by reference.

The modulation system 700 also includes two drive circuits 240, each electrically connected to a respective MZ modulator 212. Each drive circuit 240 generates an RZ electrical drive signal 223, as described heretofore, and drives the respective MZ modulator 212 with the RZ electrical drive signal 223. In response to the RZ electrical drive signal 223, the respective MZ modulator 212 generates an RZ optical data signal 233, which is a component of an RZ-QPSK or an RZ-DQPSK optical data signal 734.

Figure 8:
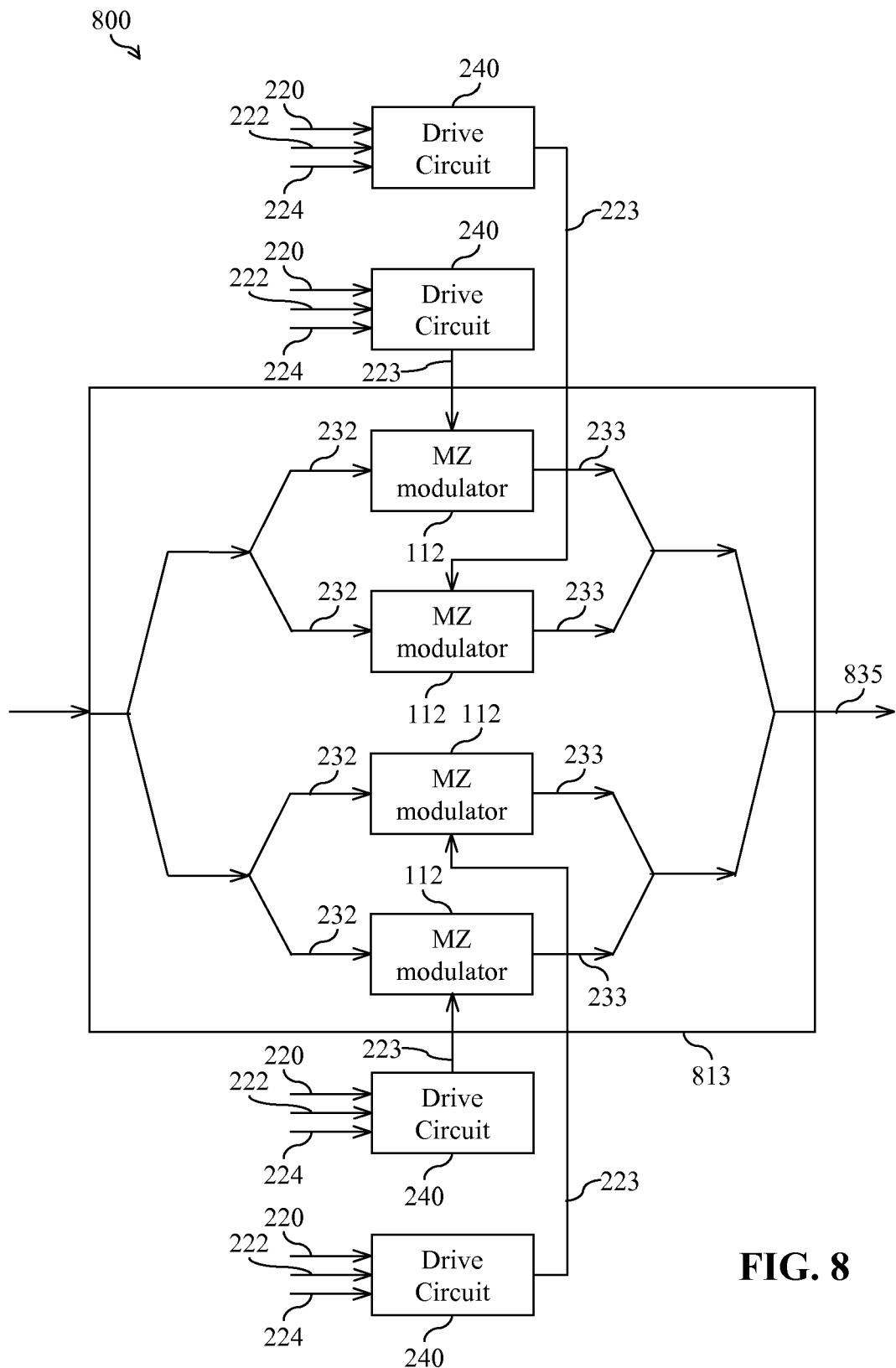
FIG. 8 is a block diagram of a third embodiment of a modulation system according to the present invention.

For another example, with reference to FIG. 8, a third embodiment of the modulation system 800, preferred for RZ dual-polarization (DP) QPSK and RZ-DP-DQPSK applications, includes four MZ modulators 212, which are optically connected in parallel as components of a quad-parallel Mach-Zehnder (QPMZ) modulator 813. A prior-art QPMZ is described in U.S. Patent Application No. 2010/0111464 to Kissa, published on May 6, 2010, for example, which is incorporated herein by reference.

The modulation system 800 also includes four drive circuits 240, each electrically connected to a respective MZ modulator 212. Each drive circuit 240 generates an RZ electrical drive signal 223, as described heretofore, and drives the respective MZ modulator 212 with the RZ electrical drive signal 223. In response to the RZ electrical drive signal 223, the respective MZ modulator 212 generates an RZ optical data signal 233, which is a component of an RZ-DP-QPSK or an RZ-DP-DQPSK optical data signal 835.

The present invention also provides a method of generating an RZ optical data signal by driving an MZ modulator with an RZ electrical drive signal, which may be carried out by using any embodiment of the modulation system. In a first step, an MZ modulator is provided. Optionally, the MZ modulator may be biased at a minimum of its transfer function, as explained heretofore. In a second step, an RZ electrical drive signal is generated by receiving a non-return-to-zero (NRZ) electrical data signal, an inverse of the NRZ electrical data signal, and an inverse of an electrical clock signal, by applying a logic XOR operation to the NRZ electrical data signal and the inverse of the electrical clock signal to generate an electrical intermediate signal, by optionally adjusting the amplitude of the inverse of the electrical data signal, as explained heretofore, and by differentially amplifying the electrical intermediate signal and the inverse of the electrical data signal to generate the RZ electrical drive signal. In a third step, the RZ optical data signal is generated by driving the MZ modulator with the RZ electrical drive signal.

Of course, numerous other embodiments may be envisaged without departing from the spirit and scope of the invention.

I claim:

1. A modulation system for generating a return-to-zero (RZ) optical data signal, comprising:
a Mach-Zehnder (MZ) modulator for generating the RZ optical data signal in response to an RZ electrical drive signal; and
a drive circuit, electrically connected to the MZ modulator, for generating the RZ electrical drive signal, and for driving the MZ modulator with the RZ electrical drive signal, comprising:
   i) a logic XOR gate for receiving a non-return-to-zero (NRZ) electrical data signal and an inverse of an electrical clock signal, and for applying a logic XOR operation to the NRZ electrical data signal and the inverse of the electrical clock signal to generate an electrical intermediate signal; and
   ii) a differential amplifier, electrically connected to the logic XOR gate and to the MZ modulator, for receiving the electrical intermediate signal and an inverse of the NRZ electrical data signal, and for differentially amplifying the electrical intermediate signal and the inverse of the NRZ electrical data signal to generate the RZ electrical drive signal.

2. The modulation system of claim 1, wherein the drive circuit further comprises an amplitude adjuster, electrically connected to the differential amplifier, for adjusting an amplitude of the inverse of the NRZ electrical data signal to ensure that the inverse of the NRZ electrical data signal and the electrical intermediate signal are substantially amplitude-balanced when received by the differential amplifier.

3. The modulation system of claim 2, wherein the amplitude adjuster is a buffer amplifier for amplifying the inverse of the NRZ electrical data signal.

4. The modulation system of claim 2, wherein the amplitude adjuster is an attenuation pad for attenuating the inverse of the NRZ electrical data signal.

5. The modulation system of claim 1, wherein the NRZ electrical data signal, the inverse of the electrical clock signal, the electrical intermediate signal, and the inverse of the NRZ electrical data signal are 2-level signals, and wherein the RZ electrical drive signal is a 3-level signal.

6. The modulation system of claim 1, wherein the MZ modulator is biased at a minimum of a transfer function of the MZ modulator.

7. The modulation system of claim 6, wherein the MZ modulator is biased at a bias voltage of approximately two times a switching voltage of the MZ modulator.

8. The modulation system of claim 7, wherein the RZ electrical drive signal has an amplitude of approximately two times the switching voltage of the MZ modulator.

9. The modulation system of claim 1, wherein the MZ modulator is a component of a dual-parallel Mach-Zehnder (DPMZ) modulator, and wherein the RZ optical data signal is a component of an RZ quadrature phase-shift keying (QPSK) optical data signal or of an RZ differential quadrature phase-shift keying (DQPSK) optical data signal.

10. The modulation system of claim 1, wherein the MZ modulator is a component of a quad-parallel Mach-Zehnder (QPMZ) modulator, and wherein the RZ optical data signal is a component of an RZ dual-polarization quadrature phase-shift keying (DP-QPSK) optical data signal or of an RZ dual-polarization differential quadrature phase-shift keying (DP-DQPSK) optical data signal.

11. A method of generating a return-to-zero (RZ) optical data signal, comprising:
a) providing a Mach-Zehnder (MZ) modulator;
b) generating an RZ electrical drive signal by:
   i) receiving a non-return-to-zero (NRZ) electrical data signal, an inverse of the NRZ electrical data signal, and an inverse of an electrical clock signal;
   ii) applying a logic XOR operation to the NRZ electrical data signal and the inverse of the electrical clock signal to generate an electrical intermediate signal; and
   iii) differentially amplifying the electrical intermediate signal and the inverse of the electrical data signal to generate the RZ electrical drive signal; and
c) generating the RZ optical data signal by driving the MZ modulator with the RZ electrical drive signal.

12. The method of claim 11, further comprising, prior to b)iii), adjusting an amplitude of the inverse of the NRZ electrical data signal to ensure that the inverse of the NRZ electrical data signal and the electrical intermediate signal are substantially amplitude-balanced.

13. The method of claim 11, wherein the NRZ electrical data signal, the inverse of the electrical clock signal, the electrical intermediate signal, and the inverse of the NRZ electrical data signal are 2-level signals, and wherein the RZ electrical drive signal is a 3-level signal.

14. The method of claim 11, further comprising, prior to c), biasing the MZ modulator at a minimum of a transfer function of the MZ modulator.

15. The method of claim 14, wherein the MZ modulator is biased at a bias voltage of approximately two times a switching voltage of the MZ modulator.

16. The method of claim 15, wherein the RZ electrical drive signal has an amplitude of approximately two times the switching voltage of the MZ modulator.

17. The method of claim 11, wherein the MZ modulator is a component of a dual-parallel Mach-Zehnder (DPMZ) modulator, and wherein the RZ optical data signal is a component of an RZ quadrature phase-shift keying (QPSK) optical data signal or of an RZ differential quadrature phase-shift keying (DQPSK) optical data signal.

18. The method of claim 11, wherein the MZ modulator is a component of a quad-parallel Mach-Zehnder (QPMZ) modulator, and wherein the RZ optical data signal is a component of an RZ dual-polarization quadrature phase-shift keying (DP-QPSK) optical data signal or of an RZ dual-polarization differential quadrature phase-shift keying (DP-DQPSK) optical data signal.

* * * * *